No. 746,387. PATENTED DEC. 8, 1903.
C. L. SCHALITZ.
MEANS FOR COILING PIPES.
APPLICATION FILED APR. 27, 1903.
NO MODEL.

Witnesses,
Inventor,
Carl L. Schalitz

No. 746,387. Patented December 8, 1903.

UNITED STATES PATENT OFFICE.

CARL L. SCHALITZ, OF SAN FRANCISCO, CALIFORNIA.

MEANS FOR COILING PIPES.

SPECIFICATION forming part of Letters Patent No. 746,387, dated December 8, 1903.

Application filed April 27, 1903. Serial No. 154,573. (No model.)

*To all whom it may concern:*

Be it known that I, CARL L. SCHALITZ, a citizen of the United States, residing in the city and county of San Francisco, State of California, have invented an Improvement in Means for Coiling Pipes; and I hereby declare the following to be a full, clear, and exact description of the same.

My invention relates to improvements in means for coiling soft-metal pipes of lead, copper, &c., for use as worms or condensers in stills.

The object of my invention is to provide a simple method of coiling pipe rapidly and at very small expense and by which not a mar or sign of a dent will be left in the pipe or other evidence given of the means employed.

It consists of the parts and the construction and combination of parts hereinafter more fully described, having reference to the accompanying drawings, in which—

Figure 1:
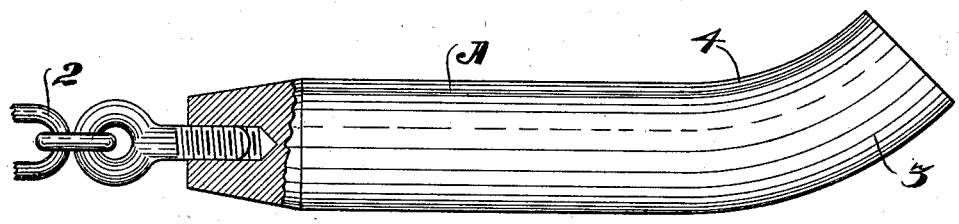
Figure 2:
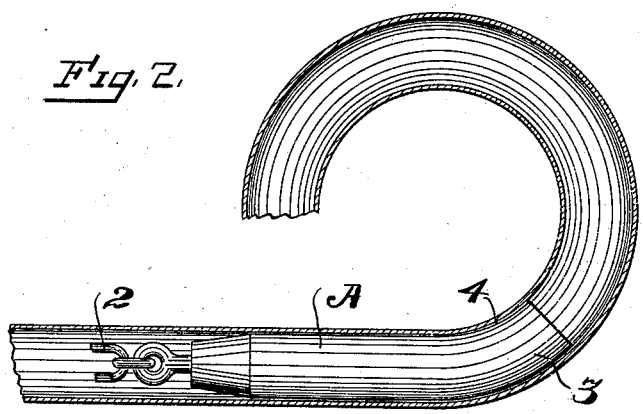

Figure 1 is a side view, in partial section, of my invention. Fig. 2 is a pipe in section showing application of my invention.

A represents a rigid plug having its mediate portion straight and with its front end tapered and provided with suitable means for the attachment of a cord or chain, as 2. The rear end of the plug is curved, as at 3, on a radius essentially equal to the radius of the desired curve to be given to the pipe. The diameter of the plug is essentially such as just to fit the interior of the pipe to be bent and to slide in the pipe without binding.

In operation the chain is run through a pipe and power applied to draw the plug after it. The feed of the plug into and through the pipe causes the latter to be gradually bent into a coil in conformity with the bent portion 3 of the plug. Suitable means, not necessary here to be shown, are provided to hold the unbent portion of the pipe rigid immediately in advance of the moving plug. When the latter issues from the end of the pipe, the pipe will be coiled perfectly and evenly from end to end. There will not be a kink or dent of any description, since the plug serves the double purpose of a core or mandrel to support the pipe against collapse and also provides the means for bending the pipe.

Plugs of suitable length, curve, and diameter are provided for each variation in size of pipe or diameter of coil.

Having thus described my invention, what I claim, and desire to secure by Letters Patent, is—

As an improved article of manufacture, a rigid, inflexible plug having its mediate portion straight, its front end tapered and provided with means for the attachment of a cord or chain, and its rear end curved on a radius essentially equal to the radius of the curve to be given to the pipe, said plug being of uniform diameter from the base of the tapered front to the extremity of the curved rear end and which diameter is substantially the inner diameter of the pipe in which the plug is to slide without binding.

In witness whereof I have hereunto set my hand.

CARL L. SCHALITZ.

Witnesses:
S. H. NOURSE,
JESSIE C. BRODIE.